Jan. 20, 1925. 1,523,590
G. D. HARTSHORN
SPRAYING MACHINE
Original Filed Oct. 29, 1923 2 Sheets-Sheet 1
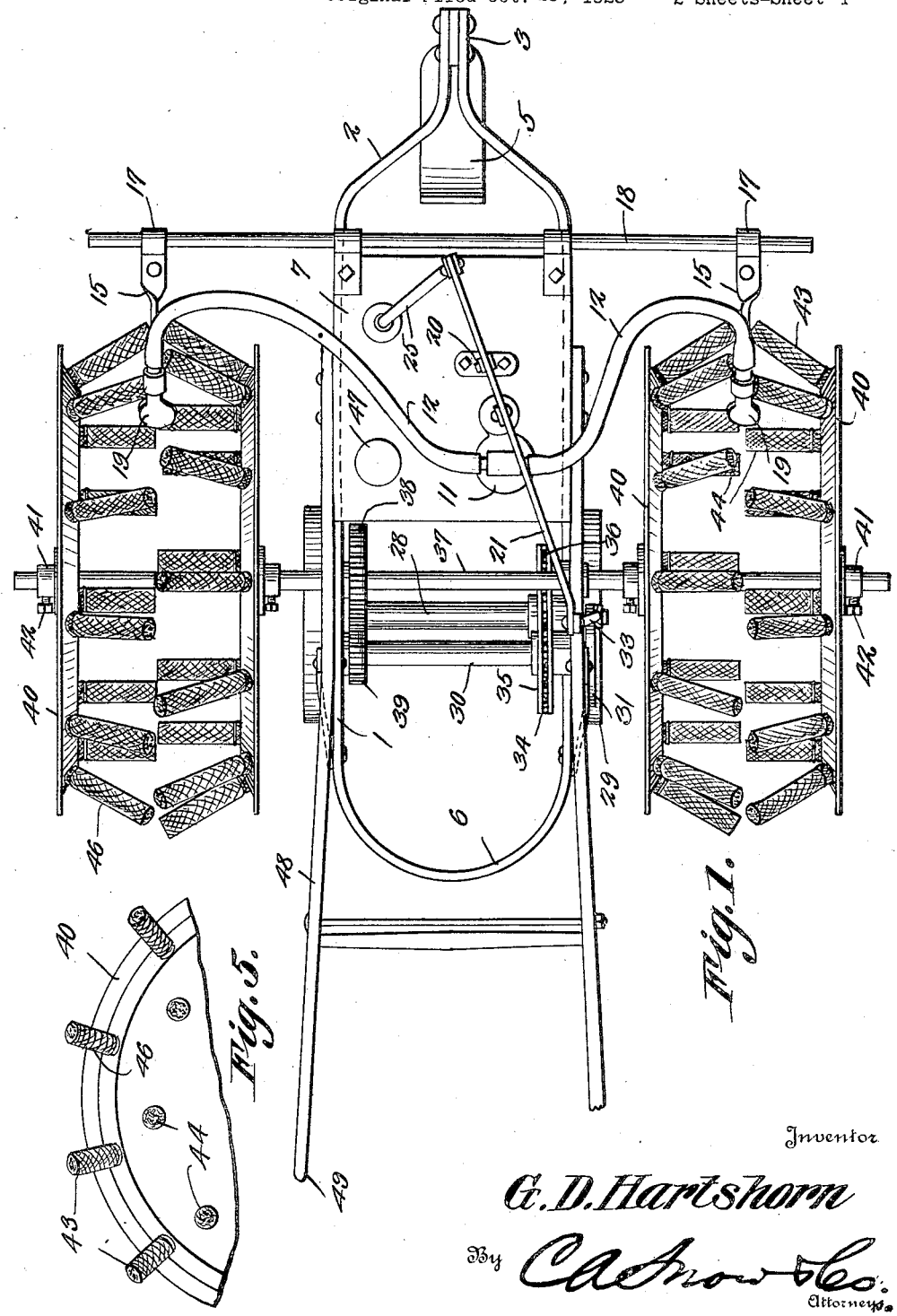
Inventor
G. D. Hartshorn
By C. A. Snow & Co.
Attorneys

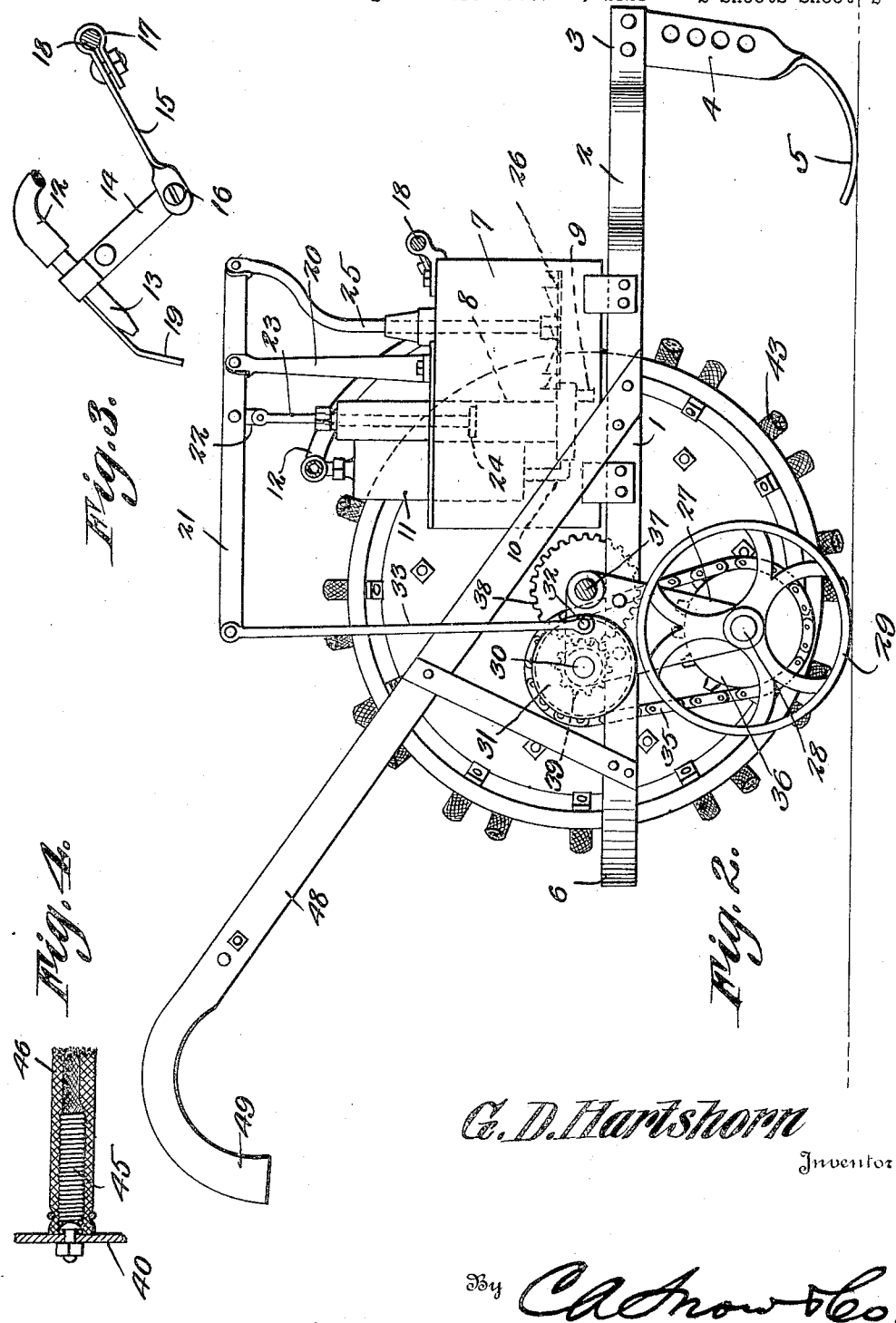

Patented Jan. 20, 1925.

1,523,590

UNITED STATES PATENT OFFICE.

GEORGE D. HARTSHORN, OF CORDELE, GEORGIA.

SPRAYING MACHINE.

Application filed October 29, 1923, Serial No. 671,548. Renewed December 12, 1924.

*To all whom it may concern:*

Be it known that I, GEORGE D. HARTSHORN, a citizen of the United States, residing at Cordele, in the county of Crisp and State of Georgia, have invented a new and useful Spraying Machine, of which the following is a specification.

This invention relates to a spraying machine designed primarily for use in the treatment of cotton plants and other vegetation whereby poison can be distributed over the foliage for the purpose of killing boll weevils and other insects detrimental to the plants.

Another object is to provide a structure of this character which operates both to apply a liquid to the foliage and to distribute it thereover through the action of wipers provided for that purpose, thereby to insure distribution of the liquid to all portions of the foliage.

Another object is to provide wipers which also operate as means for agitating the plants so as to knock off perforated squares and also disturb the insects so that they will emerge from the squares.

A still further object is to provide simple and efficient means whereby, during the forward movement of the machine the fluid to be distributed is placed under compression so that its discharge in the form of a spray is insured.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings

Figure 1 is a plan view of the machine.

Fig. 2 is a side elevation thereof, one of the combined wiping and agitating units being removed.

Fig. 3 is a side elevation of one of the spraying nozzles and adjacent parts.

Fig. 4 is an enlarged section through one of the fingers of a wiping unit.

Fig. 5 is an elevation of a portion of one of the disks.

Referring to the figures by characters of reference 1 designates a frame the sides of which converge at the front end as shown at 2 to provide a tongue 3 to which is connected a standard 4 having a runner 5 at its lower end. This runner is employed for supporting the forward end of the machine. It is to be understood, however, that any other suitable means may be utilized for this purpose. The back end of the frame can be formed of a transversely bowed portion 6 integral with the sides of the frame as shown in Fig. 1.

On the front portion of the frame is mounted a tank 7 in which is supported a pump cylinder 8 having an inlet 9 and an outlet 10, the outlet opening into a cylinder 11 to the upper end of which are connected flexible tubes 12 or the like provided at their outer ends with nozzles 13. These nozzles are supported by adjustable brackets which are preferably formed of arms 14 and 15 clamped together as shown at 16 and provided with any suitable means such as a split sleeve 17 whereby the brackets can be secured adjustably to a transversely extending rod 18 mounted on and extending laterally from the front portion of the tank 7. Arranged over and in front of each nozzle is a deflecting blade 19 for the purpose of breaking up a jet of liquid discharged thereagainst, thereby to produce a fan-shaped spray. This nozzle and deflector can be of any well known construction and detailed description thereof is not deemed necessary.

A standard 20 is mounted on the top of the tank 7 and fulcrumed thereon is a lever 21. Connected to this lever at one side of the standard is a link 22 adapted to transmit motion to a piston rod extending from a piston 24 slidable within the cylinder 8. Any suitable arrangement of valves, not shown, may be provided whereby during the upstroke of the piston 24 liquid will be sucked from the tank 7 through inlet 9 into cylinder 8 and, during the downstroke of the piston, said liquid will be forced from cylinder 8 through outlet 10, into cylinder 11 and thence to the flexible hose or tubes 12.

Pivotally connected to one end of the lever 21 so that standard 20 projects between it and the rod 23 is a rod 25 slidable within the top of the tank and connected to an agitating disk 26. Thus during oscillation of lever 21 the pump piston 24 will be actuated and the agitating disk 26 will be reciprocated so as to thoroughly stir the contents of the tank 7. The construction of the disk 26 is immaterial as any suitable agitating means can be used. It is for this reason that no detailed illustration or description thereof is given.

Extending downwardly from the sides of the frame 1 are brackets 27 in which is mounted an axle 28 supported by wheels 29. A transverse shaft 30 is journaled on the frame 1 and is provided with a disk 31 having a wrist pin 32 connected by a rod 33 to one end of lever 21. A sprocket 34 is secured to this shaft and is adapted to receive motion through a chain 35 from a sprocket 36 rotating with one of the wheels 29. Thus when the machine is moved forward, lever 21 will be actuated to agitate and expel the contents of tank 7.

Another transverse shaft 37 is journaled on the frame 1 and has its ends extending laterally beyond the frame. To this shaft 37 is secured a gear 38 meshing with a similar gear 39 secured to and rotating with shaft 30. Thus when the machine is moved forward the shaft 37 will be rotated.

Mounted on each projecting end of the shaft 37 are opposed spaced disks 40 each of which has a hub 41 adjustably secured to the shaft in any suitable manner, as by means of set screws 42. Extending from each of the disks 40 are concentric series of combined agitating and wiping fingers 43 and 44, the fingers 44 of the inner series being preferably extended substantially horizontally and toward the corresponding fingers on the opposed disk adjacent thereto. The fingers 43 of the outer series on the two adjoining disks converge outwardly as shown. These fingers can be of any preferred construction. In the form illustrated each finger includes a coiled spring 45 secured at one end to the disk. This spring projects into a tubular member 46 formed of a closely woven fabric. The disks, when rotated with the shaft 37 will cause the various fingers to agitate the plants and to wipe thereover any liquid that may have been sprayed upon the plants from the nozzles 13. It is to be understood that the nozzles 13 are substantially equi-distant between the planes of the disks at the respective sides of the machine and the disks are so located that when the machine is propelled over a field a row of plants will be received between the disks of each pair. During this operation a poison liquid will be expelled through the nozzles as before explained and delivered onto the plants. The disks and agitating fingers rotate oppositely to the wheels 29, and the fingers serve as before explained both to agitate the plants and to wipe the poison liquid over them. Thus the insects within the punctured squares will be disturbed, will emerge, and feed upon the poisoned foliage. Many of the perforated squares will be knocked from the plants so that they can be picked up by any suitable means provided for that purpose.

It is to be understood that other types of fingers can be used than the ones shown in Fig. 4 without departing from the spirit of the invention as claimed.

For the purpose of filling the tank 7, a filling opening may be formed in the top thereof, this opening being normally closed by means of a cap 47.

The machine is provided with suitably braced handle bars 48 attached to the sides thereof and provided with grips 49 so that it can be manipulated readily. A horse or any other means can be used for drawing the machine over a field.

What is claimed is:—

1. A machine of the class described, including a movable structure, a pair of rotatable disks carried by said structure for receiving a row of plants therebetween, means for spraying a liquid onto the plants between the disks, and means carried by each disk and projecting toward the opposite disk for agitating the plants and wiping the liquid therefrom.

2. The combination with a movable structure, of spaced rotatable disks carried thereby for receiving a row of plants therebetween, means for spraying liquid onto the plants between the disks, and flexible means on the respective disks and extended toward each other for wiping liquid over the plants and agitating the plants.

3. The combination with a movable structure, of spaced disks rotatable thereon for receiving a row of plants therebetween, means for adjusting the disks toward and from each other and toward and from said structure, and concentric series of fingers upon each of the disks, the fingers on each disk being extended toward the opposed disk, said fingers constituting liquid wiping means and a plant agitatin means.

4. The combination with a movable structure including supporting wheels, of a transverse shaft journaled on said structure, means operated by one of the supporting wheels for rotating the shaft, disks arranged in pairs upon and rotatable with the shaft, said disks being adjustable relative to each other, and flexible agitating and wiping fingers extending from the disks for engagement with plants received between the disks of each pair, and means operated by the rotation of the supporting wheels for spraying plants between the disks.

5. The combination with a wheel supported structure, a liquid holding tank thereon, and spraying elements connected to the tank, of a lever supported above the tank, separate means actuated thereby for forcing liquid to the spraying elements and for agitating the contents of the tank, means operated by the rotation of one of the supporting wheels for actuating the lever, a transverse shaft journaled on the structure and extending laterally beyond the sides thereof, means for transmitting motion to said shaft, a pair of disks adjustably mounted on each end portion of said shaft, one of the spraying elements being extended beyond the inner disk of each pair, and flexible combined wiping and agitating fingers extending toward each other from the disks of each pair for engagement with plants between the disks.

In testimony that I claim the foregoing as my own, I have hereto affixed my signature in the presence of two witnesses.

GEORGE D. HARTSHORN.

Witnesses:
W. F. SCARBOROUGH,
F. L. BARTHOLOMEW.